Jan. 22, 1946.   A. T. NABSTEDT   2,393,398
CLUTCH MECHANISM
Original Filed Jan. 16, 1940   7 Sheets-Sheet 1

Inventor
Arthur T. Nabstedt
By Rockwell & Bartholow
Attorneys

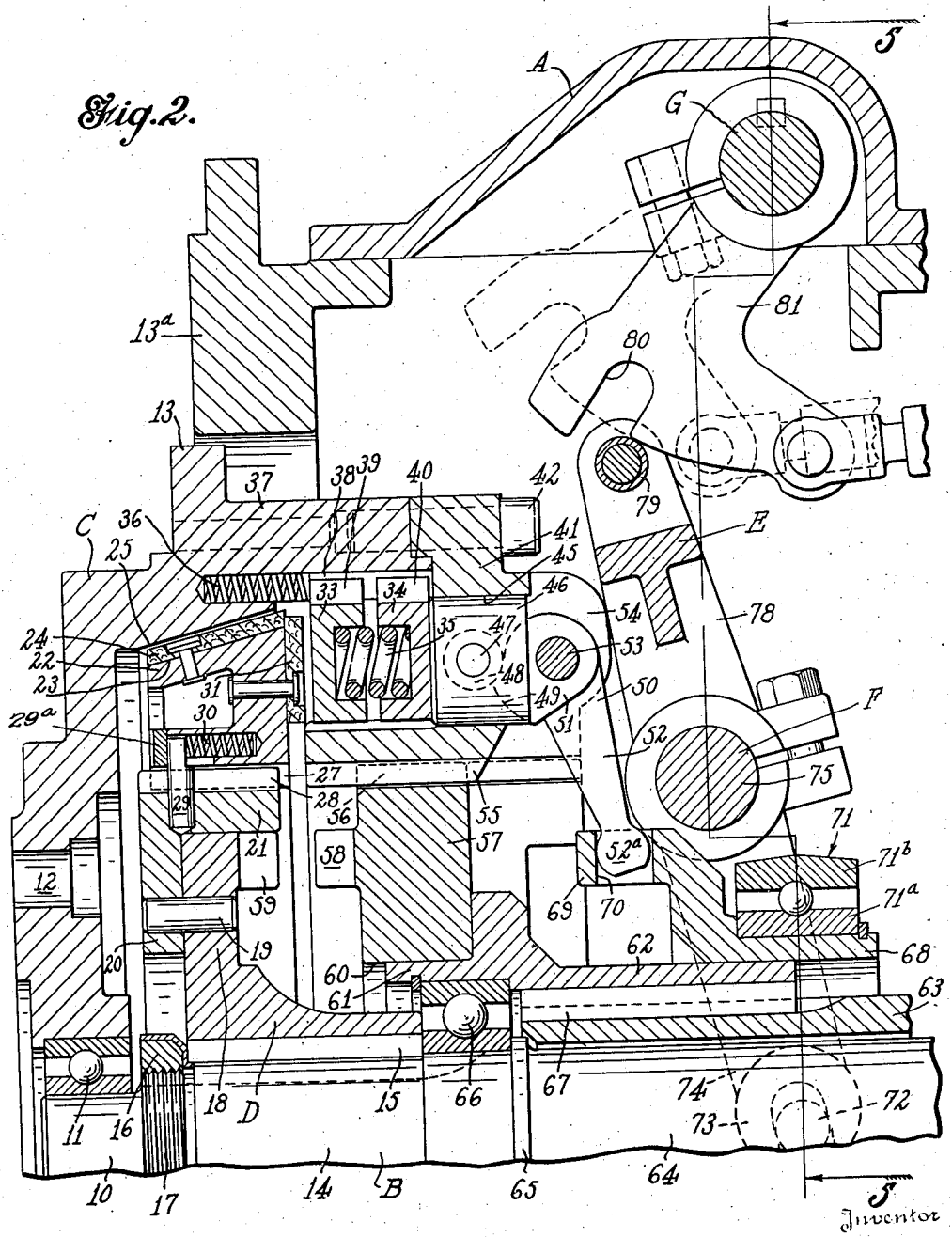

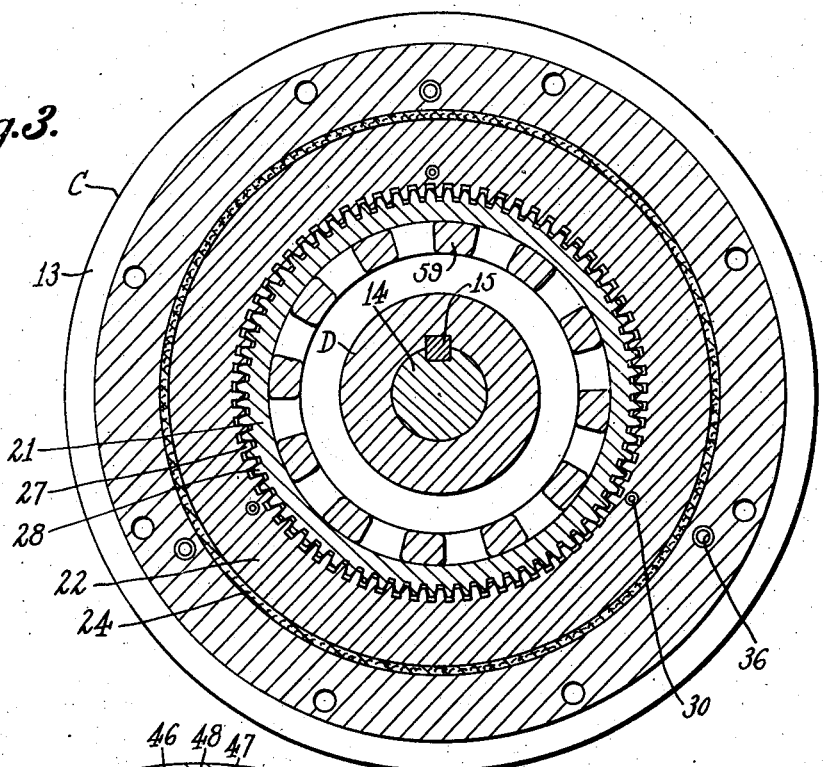
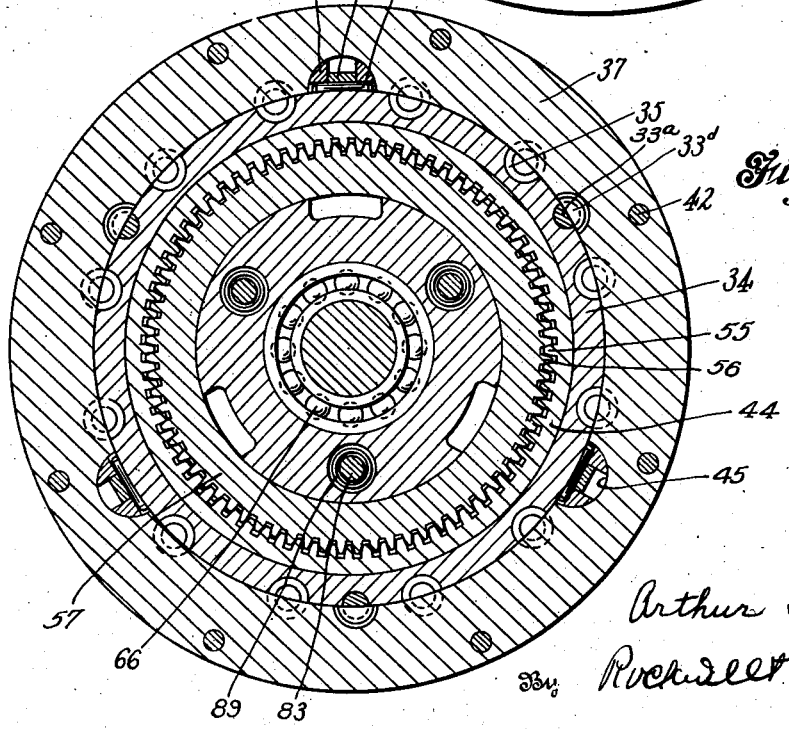

Jan. 22, 1946.    A. T. NABSTEDT    2,393,398
CLUTCH MECHANISM
Original Filed Jan. 16, 1940    7 Sheets-Sheet 4

Inventor
Arthur T. Nabstedt
By Rockwell & Bartholow
Attorneys

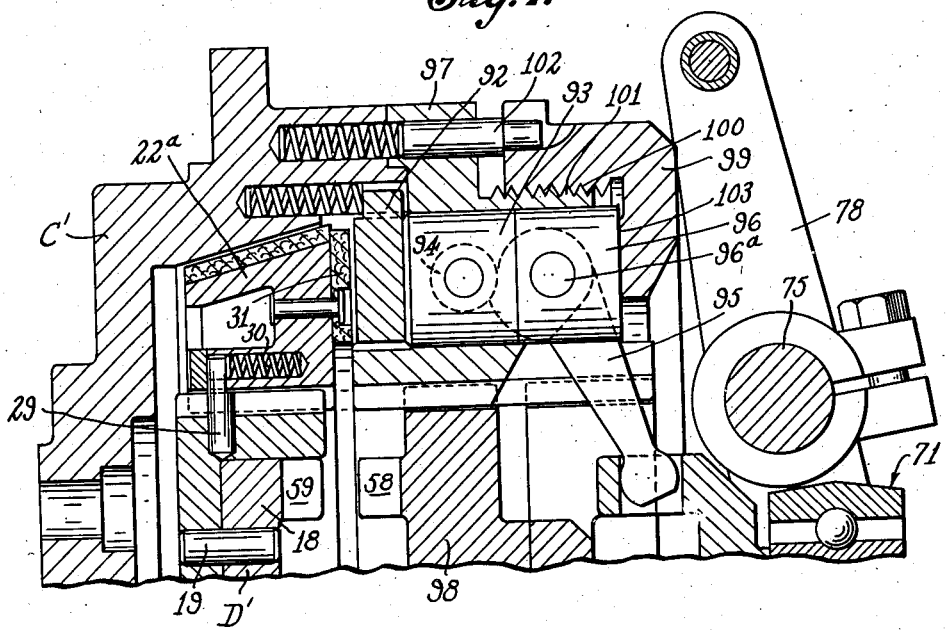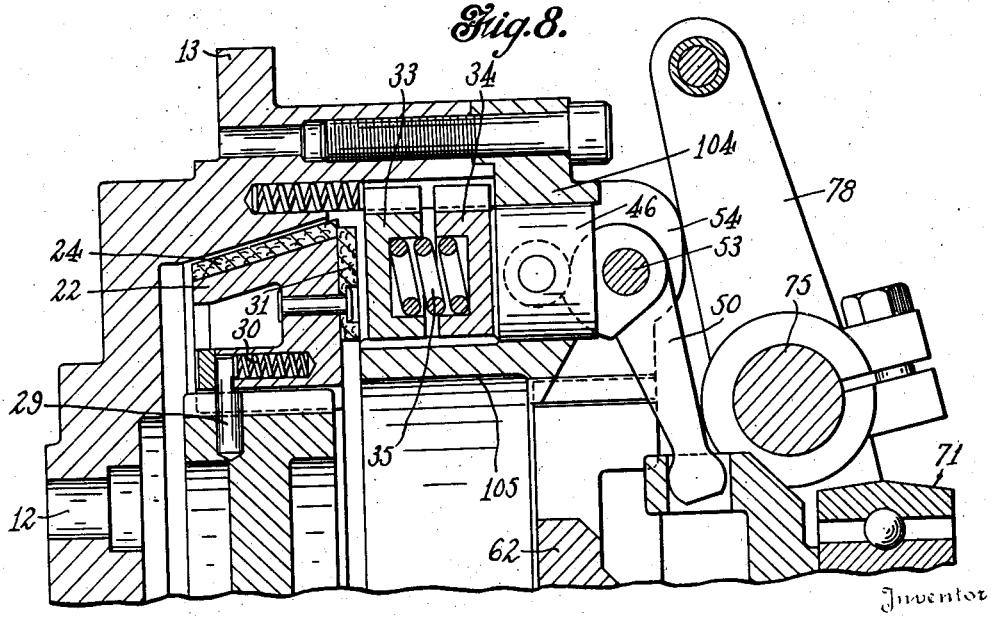

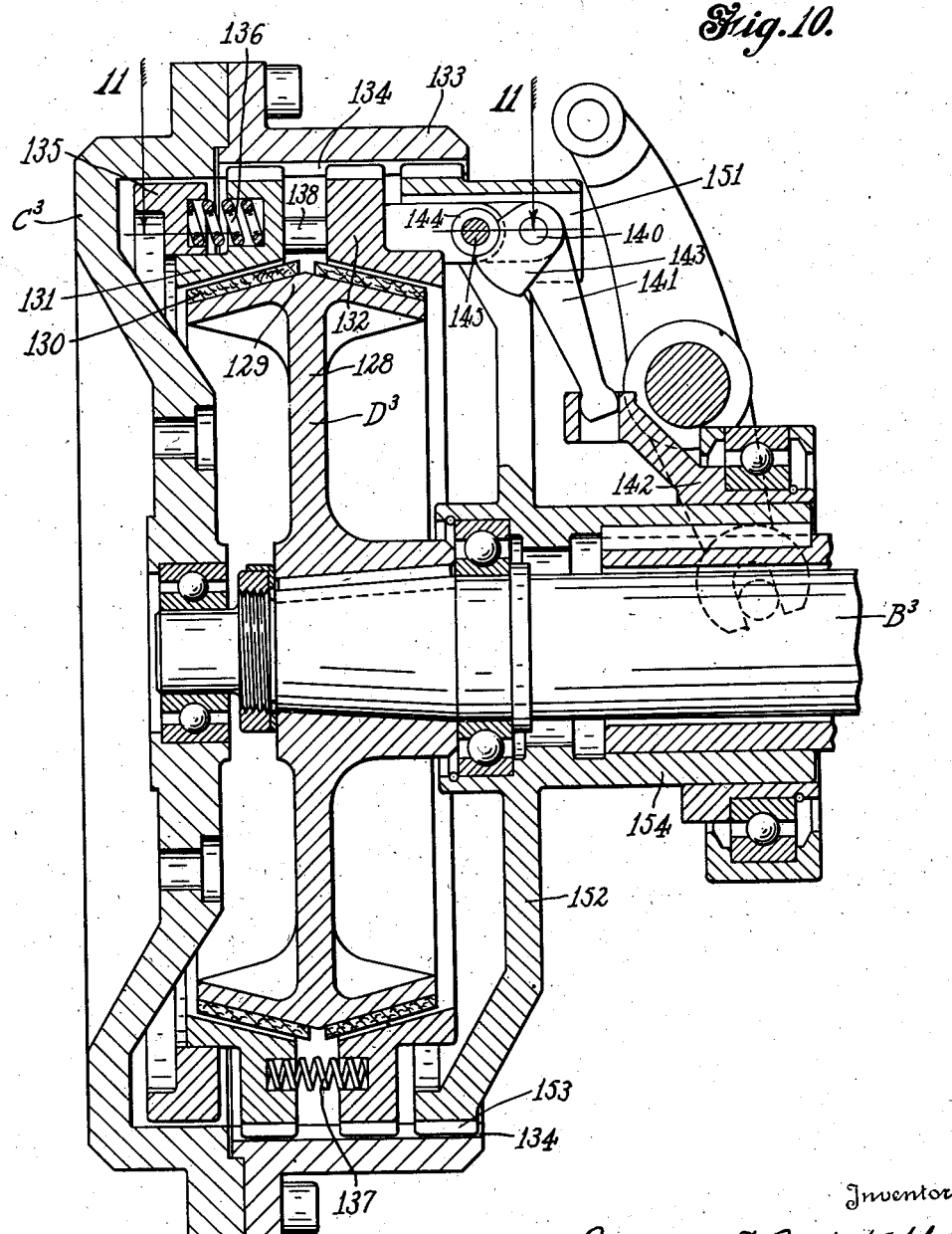

Patented Jan. 22, 1946

2,393,398

UNITED STATES PATENT OFFICE 2,393,398

CLUTCH MECHANISM

Arthur T. Nabstedt, Hamden, Conn., assignor to The Snow-Nabstedt Gear Corporation, a corporation of Connecticut Original application January 16, 1940, Serial No. 314,076. Divided and this application July 19, 1941, Serial No. 403,110

27 Claims. (Cl. 192—53)

This invention relates to clutch mechanism which can be used very advantageously in connection with marine reverse gears of the kind described in my application Serial No. 314,076, filed January 16, 1940 (Patent No. 2,286,223, dated June 16, 1942), of which the present application is a division. The improved clutch mechanism is, however, applicable to so-called one-way clutches.

One of the objects which I have in view is the provision of a clutch mechanism which is very simple and compact and is capable of transmitting a large amount of power and is rugged and strong so as to stand up under severe conditions.

Another object is to provide a simple, compact friction clutch mechanism in which the construction is such that the clutch takes hold necessarily in a gradual manner so that the load is taken gradually and without injurious shocks.

It is also a purpose of my invention, in one aspect, to provide an improved clutch involving a particular and novel arrangement and combination of friction clutch and positive clutch, the latter being so arranged that if there is slippage of the friction clutch the positive or jaw clutch will be engaged and will carry the load.

To these and other ends, the invention consists in the novel features and combinations of parts to be hereinafter described and claimed.

In the accompanying drawings:

Fig. 2 is a further vertical longitudinal section showing the upper forward part of the reverse gear, with the clutch mechanism disengaged, this being the neutral position;

Figure 1:
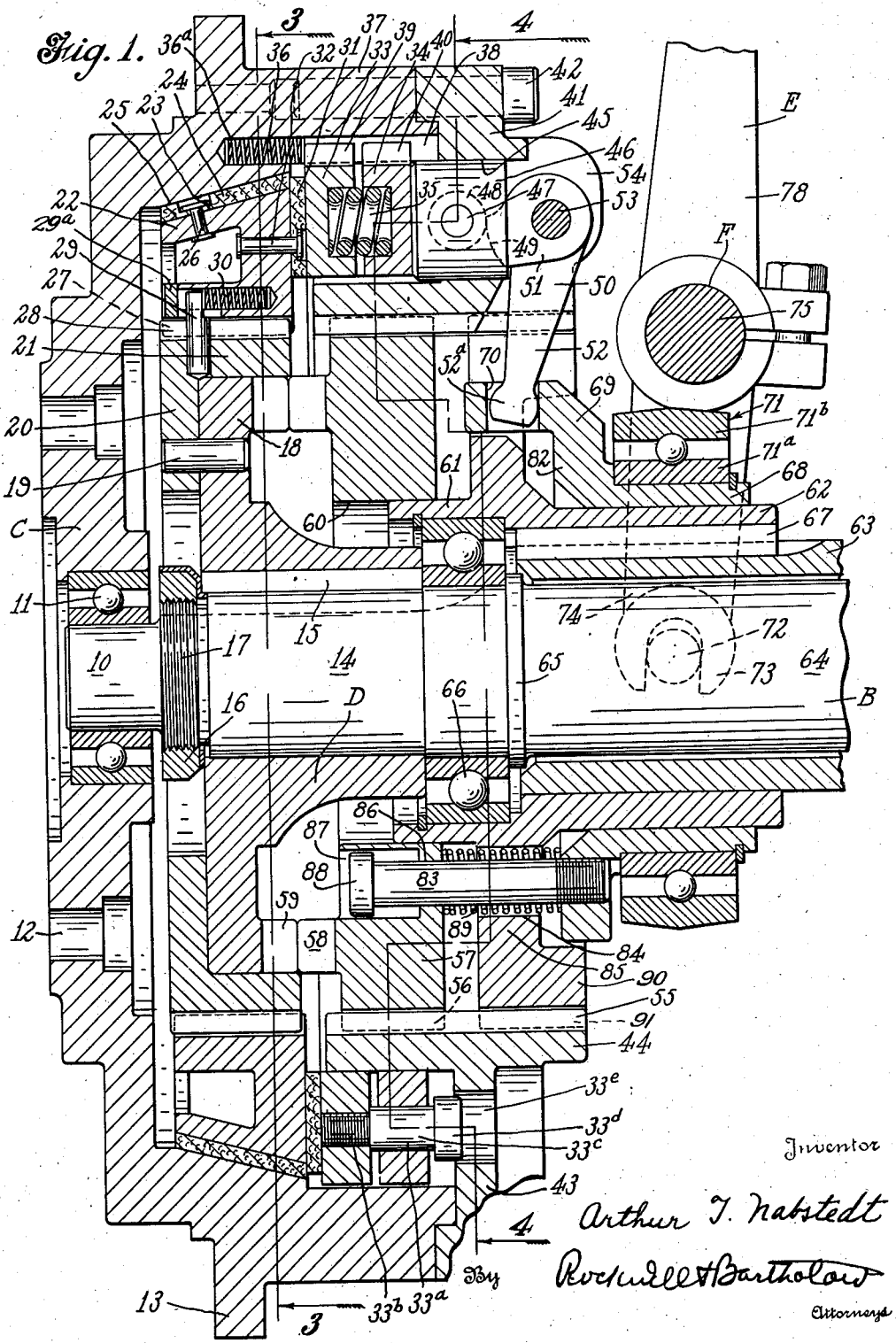
Fig. 1 is a vertical longitudinal section of a portion of a reverse gear embodying clutch mechanism constructed in accordance with my invention, the clutch mechanism being shown as having the friction surfaces interengaged for forward drive but the positive or jaw clutch not yet being engaged.
Figure 5:
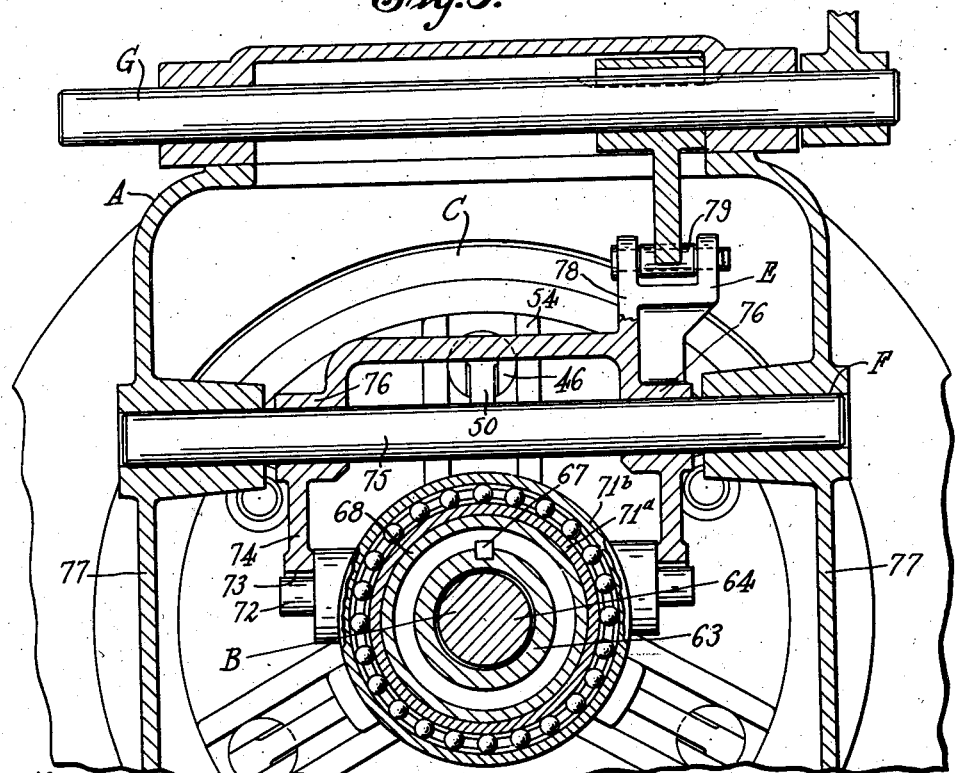
Figure 6:
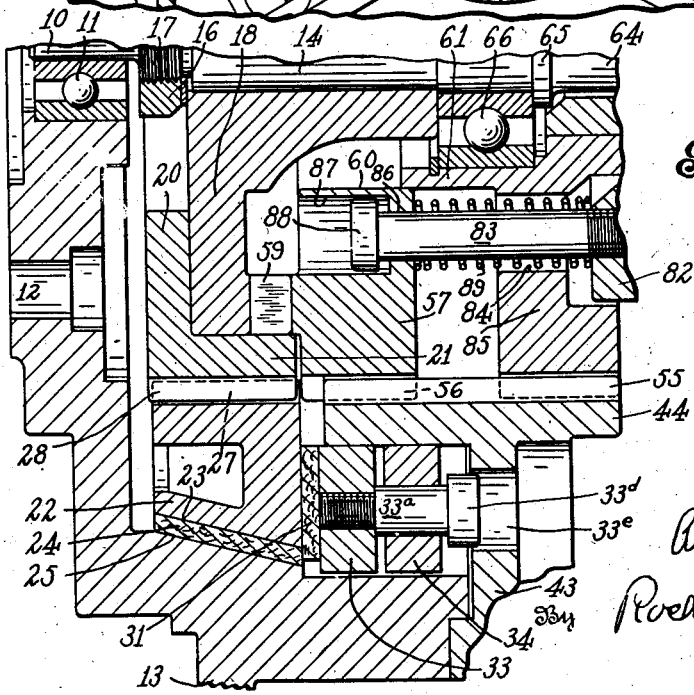
Figure 9:
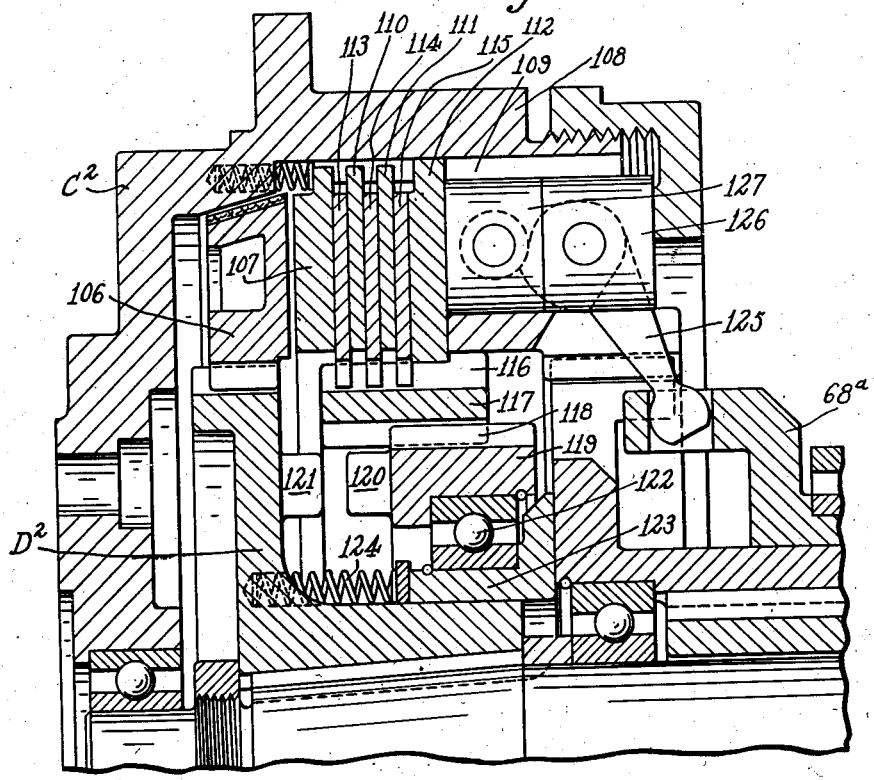
Figure 11:
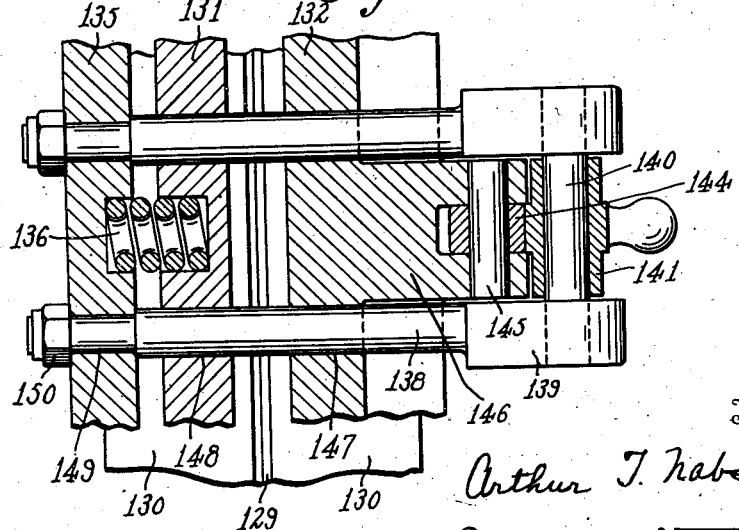

Figs. 3 and 4 are respectively sections on lines 3—3 and 4—4 of Fig. 1;

Fig. 5 is a section on line 5—5 of Fig. 2;

Fig. 6 is a view of the parts shown at the lower portion of Fig. 1, illustrating the position of the positive or jaw clutch when it is fully engaged;

Fig. 7 is a sectional view illustrating a modified form of the friction clutch mechanism;

Fig. 8 is a sectional view of a modification in which the positive or jaw clutch is omitted;

Fig. 9 is a vertical longitudinal section of a portion of a reverse gear showing a further modified form of the clutch mechanism;

Fig. 10 is a partial vertical longitudinal section of another reverse gear embodying yet another form of friction clutch; and Fig. 11 is a section on line 11—11 of Fig. 10.

In the drawings, I have shown my improved clutch mechanism in a relation in which it may be used in marine transverse gears or transmissions, but this is merely by way of illustration. In a reverse gear of the kind shown, the clutching action takes place between an engine driven member in the nature of a disk or flange and a hub, the hub being fixed on the forward end of a so-called central shaft of the reverse gear and being located within the forward end portion of the reverse gear in close proximity to the engine driven member. In such an installation, the engine driven member is preferably cupped or dished, with its cupped or dished portion rearwardly directed and located so as to be in enclosing relation to the hub and to the clutch mechanism which is effective to clutch the engine driven member to the hub. The clutch mechanism is movable to engaged and disengaged positions by means of a lever pivoted within the reverse gear housing at the rear of the clutch, this lever being operably connected to a clutch-operating collar encircling the so-called central shaft, which in this particular case is the driven shaft, adapted to be coupled at its rear end to the propeller shaft or other takeoff.

In the drawings, a portion of the reverse gear housing is shown at A (Fig. 2), the central shaft at B, the engine driven flange at C, and the hub on shaft B at D. The clutch mechanism serves to clutch the member C to the hub member D, and in the form illustrated in Figs. 1–6, this clutch mechanism comprises a friction clutch and an associated positive or jaw clutch. The lever by which the clutch mechanism is engaged and disengaged is indicated at E, the same being pivoted intermediate of its ends as shown at F. In the particular case shown, the lever E is operated from a transverse operating rock shaft G of the reverse gear as hereinafter described.

Referring now to the details, it will be noted that the forward extremity of driven shaft B is reduced, as shown at 10, and has disposed about it an anti-friction bearing 11 providing for the free rotation of the flange C, which flange C in this case is provided with holes 12 by means of which it can be bolted to a suitable flange (not shown) on the engine shaft. The drive flange C is of a cupped or dished shape, with its cupped or dished side disposed rearwardly to enclose the hub and certain clutch parts, and at the periphery of flange C is a rim or shoulder 13 operating with suitable clearance in a flange 13ª with which housing A is provided at its forward end. To the right of portion 10 (Fig. 1), shaft B has a full-diametered portion 14 to which is keyed by a key 15 the hub member D. This hub member is prevented from dislocation on the shaft by a nut 16 engaging screw threads 17 on the shaft. The hub D has a lateral flange or web 18 to which is pinned by pins 19 a member 20 having an axial flange 21. On the outer surface of the flange 21 and on its supporting body, is mounted a clutch member or ring 22. This member is part of a cone clutch, having a conical surface 23 carrying clutch-facing material 24 adapted to be brought into contact with a conical surface 25 provided within the flange member C. The clutch facing is held in place by rivets 26. The clutch member 22 cannot rotate relatively to its support because it is provided with inwardly extending teeth or splines 27 engaging cooperating teeth or splines 28 on the rim of the part 20, 21, but the clutch member is free to move axially within certain limits. Pins 29 provided in the member 20, 21 are abutted by springs 30 socketed in the clutch member 22, which springs normally hold the clutch member in released position with respect to its coacting conical surface in member C. Plugs 29ª acting in cooperation with the pins 29 limit the movement of the member 22 in a clutch-releasing direction (Fig. 2).

At the inner or right hand face (Fig. 1) of clutch member 22, clutch-facing material 31 is held in place by rivets 32. This clutch-facing material is adapted to be contacted by the face of clutch ring or plate 33 forming a part of a two-plate spring loaded clutch member. The other plate of this member is shown at 34, and it will be noted that these plate members 33 and 34 are normally held in slightly separated positions by means of small suitably socketed coil springs 35 interposed between the plates at suitable intervals. Coil springs 36 placed in sockets 36ª of the flange C are effective to release the frictional engagement between plate 33 and the inner face of member 22. The plates 33 and 34 are enclosed within a peripheral wall or rim portion 37 extending rearwardly from the flange C, and this wall is provided at its inner face with splines 38 engaged by teeth or splines 39 on plate 33 and by teeth or splines 40 on plate 34, whereby rotation of member C will be effective to rotate the clutch plates 33 and 34.

At the rear of the annular wall 37 of member C there is provided a ring-shaped member 41 which is secured to the wall 37 by a plurality of screws 42. The member 41 has at its periphery a shouldered portion engaging the correspondingly shouldered rear edge portion of wall 37, and the member 41 also has a web portion 43 best shown at the lower part of Fig. 1, extending parallel to and enclosing plates 33 and 34, which web portion is integrally joined with an axial flange portion 44 that overlies and encloses the clutch plates aforesaid at their inner portions. At suitable intervals the web portion 43 is provided with bores 45 to accommodate plungers 46 for shifting the clutch plate 34. Mounted transversely in each of the plungers 46 is a pin 47 carrying a roller 48 that is adapted to be engaged by the cam-like surface 49 of an elbow lever 50 having a short roller-engaging arm 51 and a longer actuating arm 52, said elbow lever having a pivot pin 53 mounted between lugs 54 projecting rearwardly from member 41. The actuating arms 52 of the elbow levers are connected with suitable actuating mechanism to be presently described.

For the purpose of controlling the relative movements of the clutch plates 33 and 34, guide and stop pins, such as shown at 33ª, may be employed, these stop pins being located at suitable intervals in the circumference of the plates. Such pins may have threaded shanks 33ᵇ engaging screw-threaded sockets in plate 33, and they may have cylindrical bodies 33ᶜ engaging correspondingly shaped holes in plate 34, and they may be provided at their inner ends with round heads 33ᵈ which serve as stop members. The heads 33ᵈ may operate in holes 33ᵉ provided in the web portion 43.

The axial flange 44 of member 41 is provided at its inner surface with splines 55 which are engaged by correspondingly formed but shorter splines 56, formed at the periphery of a ring or washer-shaped member 57 disposed in a space adjacent the hub D. The member 57 is part of a positive or jaw clutch, and in this form is provided on its forward face with an annular series of projecting dogs or lugs 58 that are preferably in the form of small blocks. These blocks are spaced apart uniformly in a ring-like series and they are adapted to be projected into the correspondingly formed spaces between similarly formed and arranged rearwardly projecting dogs 59 carried on the flange or web portion 18 of the hub, the dogs 59 in this particular case being adjacent the periphery of the hub. By axial shifting of member 57 in the manner hereinafter described the dogs 58 can be caused to be projected into interlocking engagement with dogs 59, which position of the parts is shown in Fig. 6.

The ring-shaped member 57 is provided with a central aperture 60 which enables it to be slidably mounted around a forwardly projecting flange 61 of a sleeve member 62. This sleeve member is disposed about a sleeve member 63 which immediately surrounds with some clearance a portion 64 of shaft B. The portion 64 is separated from the portion 14 previously mentioned by a small shoulder 65, and at the left of this shoulder (Fig. 1) is an anti-friction bearing 66 which surrounds the shaft. This anti-friction bearing 66 at its outer part supports for free rotation the sleeve member 62 previously referred to. The sleeve member 62 is keyed to the sleeve member 63 by a key 67 so that both sleeve members can rotate as a unit with respect to the main shaft.

The body of the sleeve member 62 provides a sort of hub-like member which supports a further sleeve member 68 surrounding member 62, and member 68 is provided with axially extending portions 69 having apertures 70 receiving the inner enlarged ends 52ª of the lever arms 52 previously mentioned. Extending around the body of sleeve member 68 is an anti-friction bearing 71 providing an actuating collar for member 68, this anti-friction bearing having an inner race 71ª and an outer race 71ᵇ. The outer race 71ᵇ of this anti-friction bearing is provided at the sides with outstanding trunnions 72, which are adapted to be engaged by lower forked ends 73 of lever E. The lever E has legs 74 projecting downwardly at the respective sides of the shaft, as shown in Fig. 5. The pivot F for lever E is provided by a crossrod 75 on which lever E has bearings indicated at 76. In this particular case the crossrod 75 is mounted in and extends between parallel side walls 77 of the reverse gear housing.

The lever E is provided above the crossrod 75 with an upwardly extending arm 78 carrying at its upper end a roller 79 adapted to be engaged in a notch 80 of a lever arm 81 depending from the main operating rock shaft G previously mentioned.

Through the connections described it is possible to swing the lever E on its axis so as to move the sleeve member 68 in an axial direction, and this will cause actuation of the plungers 46 and the clutch plates 33 and 34. This axial movement of the sleeve member 68 also controls the operation of the axially shiftable ring member 57 through the following mechanism: At certain points in the periphery the web or flange portion 82, which projects from the sleeve member 68, is provided with threaded bores in which are secured pins 83, these pins 83 being passed through holes 84 in a web 85 with which sleeve member 62 is provided. These pins 83 also pass through holes 86 in member 57, which holes 86 are in communication with sockets 87 in which are slidably disposed the round heads 88 with which the pins 83 are provided. A coil spring 89 encircles each pin 83 in the space between the front face of web 82 and the rear face of member 57, and the normal tendency of this spring is to separate member 57 from member 68. Furthermore the heads 88 of pins 83, by taking up against the bottoms of the sockets 87, are enabled to pull the member 57 rearwardly when member 68 is moved rearwardly. Member 62 cannot move axially because of its conformation to and interlocking with anti-friction bearing 66, which anti-friction bearing in turn is held in place by shoulder 65 and hub D. Sleeve 62 is keyed to the shaft sleeve 63, as previously described, and sleeve 62 is rotated whenever the engine driven flange C is rotated, because of the fact that the web portion 85 of sleeve 62 carries a peripheral flanged portion 90 having peripheral splines 91 engaged with the splines 55 previously mentioned, which are formed at the inner surface of the flange 44 of member 41. Thus it is possible to drive from flange C through member 41, and to rotate sleeves 62 and 63 continually from member 41 as a result of the keyed engagement between member 62 and the flange carried by the web of member 41, and the keyed engagement between members 62 and 63. In a reverse gear, the sleeve 63 is used in connection with a gear set, as described in Patent No. 2,286,223, for imparting reverse rotation to the shaft.

For imparting forward drive to the shaft B, the parts being in the neutral position shown in Fig. 2, the rock shaft G is actuated to shift lever E to the position shown in Fig. 1. In this operation the notch 80 catches over roller 79, which causes the upper portion of lever E to be thrust rearwardly and the lower portion to be thrust forwardly, carrying forwardly the trunnions 72 on the outer ball race 71b. As the inner race 71a is thus carried forwardly, sleeve 68 is correspondingly moved, and by actuation of the elbow levers 50 previously described the plungers 46 are moved to shift the clutch plate 34. The clutch plate 34 then acts through springs 35 to exert axial pressure on clutch plate 33, which is thereby yieldingly engaged with the clutch facing on the rear face of cone clutch member 22. The result of this action is to cause the clutch facing on the conical face of member 22 to be engaged with the interior conical surface of member C, and in this manner the hub D is clutched to member C by reason of the interlock between member 22 and member 20 which is pinned to the hub D. Therefore, as a result of the action of the clutch plates 33 and 34 and the clutch member 22, the hub D is clutched to member C to rotate therewith. There is therefore a very direct drive of hub D from the peripheral portion of member C through clutch member 22 and plate member 20, 21, power being transmitted inwardly and radially to the hub member. There is furthermore a very strong frictional connection between flange member C and hub D through the annular wall or rim of the flange member, the clutch plates 33 and 34 interlocked therewith, and the frictional connection between plate 33 and the rear face of member 22. The shaft is rotated therefore in a very effective manner.

When the clutch mechanism is moved to the engaged position it takes hold very gently and gradually owing to the provision of the helical springs interposed at intervals between the clutch plates 33 and 34 and also by reason of the fact that clutch plate 33 is first engaged with and clutched to member 22 and thereupon engages member 22 and pushes it into contact with the socketed part of the engine flange. The member 22 is an axially movable friction clutch element in sliding keyed engagement with the outer portion of the hub and having a conical friction surface to engage the conical recess of the engine driven flange, and the plate 33 is an axially movable friction clutch element in sliding keyed engagement with the outer or rim portion of the flange adapted to frictionally engage said first axially movable friction clutch element to drive the same and to press it into driving engagement with the recessed portion of the flange.

As the sleeve 68 is actuated from the lever E in the manner above described, the pins 83 are also carried forward or to the left (Fig. 1), and the effect of this is to cause the coil springs 89 acting against the rear face of member 57 to be compressed, whereby member 57 is urged toward the left (Fig. 1). In being moved in that direction, member 57 may carry its dogs 58 into such a position that their front faces will contact the rear faces of the dogs 59, as shown in Fig. 1, or the action of the dogs 58, in being moved forwardly, may be such that they will enter the spaces between the dogs 59, thus locking ring 57 positively to the hub D. In case the dogs be not already interengaged there will be interengagement upon any slipping of the clutch. In such case the dogs 58 will find lodgment in the intervals between the dogs 59, as shown in Fig. 6, and there will be positive locking together of member 57 and hub D, so that there will be no further slipping and on the other hand there will be a positive drive of the hub from member C, this positive drive coming from the peripheral portion of member C to the peripheral portion of the hub through member 57, which is keyed to member 41 fastened to member C, and is adapted to be moved into dogging or toothed engagement with the hub. The movable dogs may however come into engagement at once as the friction clutch is engaged. If the dogs merely move into the abutting position upon engagement of the friction clutch, as very frequently happens, they engage without clashing, this being due to the structure of the friction clutch as above described.

Upon movement of the operating rock shaft G back to the position shown in full lines in Fig. 2, the clutch will be disengaged. The member 57 will be pulled back by the pins 83 which move back with the collar 68. The collar 68 will also act on the elbow levers or toggles to release the clutch plates 33 and 34, which will then move back to the position shown in Fig. 2 under action of springs 36. This will free the member 22, which will be shifted rearwardly by the springs 30 into a position in which it clears the conical inner surface of the engine flange.

In Fig. 7 I have shown a modified form of the friction clutch mechanism between the driving flange and the hub. In this case, instead of having two plates with interposed springs, as previously described, I employ a single plate 92 splined to the driving flange and cooperating with the conical clutch member 22ª. The clutch plate 92 is shiftable by means of plungers 93 having rollers 94 engaged by the forward ends of elbow levers 95. The levers 95 are mounted in plungers 96 abutting plungers 93, and plungers 96 and 93 are arranged to slide in member 97. A member 98 corresponding to ring member 57, previously described, provides for direct interlocking between the peripheral portion of drive flange C' and the peripheral portion of hub D'. In order to permit taking up of wear in the clutch, the mechanism is rendered adjustable by providing an adjusting ring 99 which has internal screw threads 100 engaging an exteriorly shouldered threaded part 101 on member 97. Spring-pressed removable pins 102 are adapted to lock the threaded ring 99 in the angular position to which it is adjusted. This ring 99 has a shoulder 103 overlying and pressing against the end surfaces of the plungers 96, so as to control the longitudinal position of the plungers, and therefore of clutch plate 92. It will be understood that the plungers 96 provide for adjustment of the elbow lever pivots axially of the mechanism, inasmuch as the elbow levers have pivot pins 96ª carried by the plungers and moving therewith as the plungers are adjusted. Certain portions of the elbow levers operate in appropriately cutaway parts of the plungers 96 and 93, as will be understood.

In Fig. 8 I have shown a further modification in which the clutch plates 33 and 34, previously described, are retained, but wherein the ring member 57, or its equivalent, is omitted. In this case the annular member 104 bolted to the periphery of the driving flange and serving as a clutch plate retaining member, is splined as before to sleeve 62, but in front of the splined portion member 104 is provided at 105 with a plain inner surface.

In the form shown in Fig. 9, the general arrangement is the same as that previously described, and in this case there is a friction clutch for connecting the engine driven member with a driving hub and a jaw clutch which acts in the event that there is slippage of the friction clutch. However, the arrangement of the clutches is somewhat different from those previously described in that a multiple plate clutch is interposed between the engine driven member and the movable member of the positive or jaw clutch. Here the engine driven or clutch driving flange is shown at C², and the shaft driving or clutch driven hub adjacent the same at D². Coupled to the peripheral portion of hub D² is a friction clutch ring 106 adapted to engage a conical socketed surface of the flange. The clutch ring 106 is adapted to be engaged by a clutch plate 107 similar to the plate 92 of Fig. 7. This plate 107 is keyed in the cylindrical wall or rim 108 of the engine driven member in longitudinal grooves 109, and behind plate 107, plates 110, 111 and 112 are keyed to the engine driven member by means of the grooves 109. A number of interposed plates 113, 114 and 115 are keyed in grooves 116 of an annular member 117, which in turn is connected as at 118 to a clutch ring member 119 carrying dogs 120 adapted to engage between dogs 121 on the hub member D². The ring member 119 is supported by an anti-friction bearing 122 on a member 123 surrounding the driven hub and is acted on axially by springs 124.

Clutch ring member 119 is adapted to be thrust forwardly toward the engaged position as the friction clutch member is engaged, by means such as previously described, connecting said ring member with friction-clutch-actuating sleeve 68ª. This sleeve, as in the case illustrated in Fig. 7, actuates levers 125 mounted in plungers 126 and adapted to shift coacting plungers 127. It will be seen that by movement of plunger 126 to the left (Fig. 9) the plates of the multiple plate group will be shifted to bring plate 107 against member 106, which in turn will be engaged frictionally with the engine driven member. As the friction clutch is engaged, the ring member 123 is actuated as before. If the dogs 120 and 121 have not already engaged, they will engage each other in the event that there is slippage of the friction clutch. In this form of device there can be slippage after the dogs have interengaged, but only in case the clutch is very heavily overloaded, because of the fact that there is added to the frictional engagement between members 106 and 107, the frictional engagement between the plates 113, 114 and 115 (interlocked with the clutching member 119) and the coacting plates, which are interlocked with the cylindrical wall portion of the engine driven member. Upon release of the friction clutch, plate 107 is pressed by its springs out of engagement with member 106, and the hub D² is then free from connection with the engine driven member. In the unclutched position, the two groups of plates connected respectively with the engine driven member and the positive locking ring may all turn together as a unit, the clutch ring 119 being free to turn on its anti-friction bearing. In the driving position, however, the ring 119 carrying the locking dogs and adapted to be interlocked with the driving hub of the shaft is very directly driven by a strong frictional connection (including a plurality of interengaged clutch plates under strong axial pressure) with the peripheral portion of the engine driven member extending rearwardly beyond that portion which is engaged by the cone ring 106.

In Figs. 10 and 11, I have shown another form of clutch embodying my improvements, as it appears when mounted in connection with a marine reverse gear. In this particular instance the positive clutch element is omitted, but it is to be understood that it can be used if desired in the same general way as in the forms first described. In this form of Figs. 10 and 11, the friction clutch comprises oppositely inclined conical friction surfaces so as to provide a double cone clutch, but one of these surfaces is engaged before the other so that the clutch will take hold gently and gradually, as in the forms first described. In this embodiment the engine driven member is indicated at C³ and the hub on the end of the shaft B³ at D³. The hub D³ has a web 128 provided in this particular case with an integral peripheral portion or rim 129 in the form of a double cone which provides an exterior cone friction surface at one side of the web, and a similar but oppositely inclined conical surface at the opposite side of the web. Each of these surfaces is provided with a friction facing 130. The conical friction surface at the left (Fig. 11) is adapted to be contacted by annular member 131 movably mounted, and the surface toward the right is adapted to be contacted by a movably mounted annular member 132.

It will be noted that the clutch driven member C³ is provided with a substantially cylindrical extension or wall portion 133 adjacent its periphery constituted by a part which is bolted to the flange body, and that the members 131 and 132 are disposed within this portion 133 and keyed thereto by means including longitudinal grooves 134 provided in portion 133 at the inner surface thereof. At the left-hand side of member 131 (Fig. 10) is a ring member 135 housed in an annular recess in flange C³, and between ring member 135 and member 131 coil springs 136 are socketed at intervals, in order to control the axial movement of member 131. A number of coil springs 137 are also socketed between members 131 and 132, the tendency of said springs being to separate said members to a certain degree.

At a number of points in the circumference of the clutch structure (usually three points), elbow levers are provided for operating the friction clutch and means such as shown in Fig. 11 are provided for mounting and guiding the movable clutch members 131 and 132. In each of these locations two bolts 138 are provided, which at their right-hand ends (Fig. 11) are provided with heads 139 forming cheeks that are interconnected by a pivot pin 140, on which is adapted to rock a lever 141 actuated from the sliding clutch-actuating sleeve 142. The shorter arm 143 of the lever is adapted to engage a roller 144 mounted on a pin 145 in a lug 146 projecting from the clutch member 132. The shanks of the bolts 138 pass freely through openings 147 in member 132, openings 148 in member 131, and pass through openings 149 in ring 135, the bolts having shouldered engagement with ring 135 and being rigidly fastened thereto by nuts 150.

The means for operating the clutch-actuating collar 142 is substantially the same as in the form of Fig. 1.

As the clutch-actuating collar is shifted toward the left (Fig. 10) for engaging the friction clutch, the action of the levers 141 is to cam the ring member 132 toward the left so that its inner conical clutch surface will be moved toward the coacting conical surface of the hub member D³. Upon interengagement of these clutch surfaces, the clutch member 131, by being moved to the right by the reaction, engages with its interior conical surface the coacting conical surface on the hub D³. Thus by a longitudinal thrust upon collar 142 which is not unduly powerful, a very strong and effective frictional grip upon the hub is brought about, the two oppositely inclined conical surfaces of the hub being engaged by the two oppositely inclined conical surfaces of the movable gripping rings or members that are interlocked with the peripheral portion of the engine driven flange. With the expenditure of relatively little axial force, therefore, it is possible to engage the hub frictionally in a very effective manner from the engine driven member so that the friction clutch will carry heavy loads without slipping.

The pivotal portions of the levers 141 operate in open portions 151 of a web 152 which rotates with the engine driven member by having peripheral splines 153 engaging the grooves 134. Adjacent its central portion the web 152 is made integral with a sleeve 154 which is similar to the sleeve 62 previously described, this sleeve being connected with the reversing gearing.

For extra heavy duty a positive clutching member such as the member 57, with its provisions for positive clutching engagement with the driving hub for the shaft, is of considerable advantage inasmuch as the device will work properly in the event that the friction clutch commences to slip. However, it will be only when the clutch is greatly overloaded that it will slip, because the novel clutch construction herein described enables the building of a clutch which, while of comparatively small size and weight, is able to transmit a large amount of power. It is of distinct advantage to have a friction clutch in which there is first an engagement between two coacting friction surfaces followed by interengagement of other coacting friction surfaces, bringing into action the total friction area in a sequential or progressive manner, because in this way the clutch takes up the load gradually and injurious shocks and strains are overcome or at least substantially reduced. I prefer to bring about this result by providing a clutch structure of a form previously described herein, in which the first effect is to move a movably mounted clutch ring into frictional engagement with another clutch ring and thereby push this second clutch ring, which is provided with an exterior conical surface, into frictional engagement with the inner conical part of an engine driven flange or like member. It is important to have a cone clutch between the hub and the engine driven flange so as to provide ample clearance. Thus there is entire elimination of dragging, heating and power loss such as occur in connection with the use of the ordinary multiple plate clutches. The free neutral position, reducing drag and heating, is a factor of great importance, especially if a boat have two or more propeller shafts each driven by an individual engine, because in that case it is desirable that the boat be able to cruise with one or more engines cut out, and with an engine cut out, there should be no drag in the clutch appurtenant to that engine.

It is to be understood, of course, that, while as herein described the flange member is the driving member and the hub member on the shaft is the driven member, a reversal of the arrangement in this respect is contemplated under certain conditions.

While I have shown herein several forms of my improved clutch mechanism, it will be understood that the invention can be embodied in many other forms, and that various changes and modifications in the organization of parts and in the details can be made without departing from the principles of the invention or the scope of the claims.

What I claim is:

1. In clutch mechanism, a shaft, a power-driven member mounted for rotation adjacent one end of said shaft, a hub fixed to the last-named end of the shaft, friction clutch means for clutching said power-driven member to said hub, and means of connection between said power-driven member and said hub including an axially movable member adapted to have positive clutching engagement with said hub, and a friction clutch between said axially movable member and said power-driven member.

2. In clutch mechanism, a flange having a conical socketed inner portion and an approximately cylindrical peripheral portion, a hub, means for clutching said flange to said hub comprising a ring keyed to the hub having a conical surface facing the conical surface of said flange and movable axially relatively thereto, a clutch element interlocked with the peripheral portion of said flange movable axially to make frictional contact with said ring and move said ring into frictional engagement with the conical portion of the flange, a separate plate device interlocked with the peripheral portion of said flange movable axially to shift said element and actuate it, and means for shifting said plate device.

3. In clutch mechanism, a shaft to be driven, a hub fixed to said shaft, a flange adjacent said hub having a peripheral axial extension, friction clutch means associated with the peripheral axial extension of the flange for clutching the latter to said hub, a web attached to the peripheral axial extension, and a driving connection between the flange and the hub comprising an axially movable ring mounted upon the web and arranged to be shifted into positive locking engagement with the hub.

4. In clutch mechanism, a shaft to be driven, a hub fixed to said shaft, a flange adjacent said hub having a peripheral axial extension, friction clutch means associated with the peripheral axial extension of the flange for clutching the latter to said hub, a web attached to the peripheral axial extension, and a driving connection between the flange and the hub comprising an axially movable ring mounted upon the web and arranged to be shifted into positive locking engagement with the hub, said ring being located radially inwardly of the friction clutch surfaces.

5. In clutch mechanism, a shaft to be driven, a hub fixed to said shaft, a power-driven flange adjacent said hub having an axially directed peripheral portion, friction clutch means associated with the peripheral portion of said flange for clutching the latter to the peripheral portion of said hub, comprising a sliding element keyed to the peripheral portion of said flange, levers for shifting said element, a web connected to the peripheral portion of said flange to be driven thereby, a positive locking ring mounted on said web and adapted to engage said hub, a sleeve around the shaft movable axially to shift said locking ring and actuate said levers, and means for moving said sleeve.

6. In clutch mechanism, the combination of a shaft fixedly carrying a hub, said hub having a sleeve portion embracing the shaft and a body portion extending outwardly from the sleeve portion, a recessed flange adjacent said hub at one end in opposed relation thereto and of larger diameter, said flange and said hub being fixed against axial movement, friction clutch means including a part engageable within the flange for clutching the rim part of the body portion of the hub to the flange, and means comprising an axially movable locking ring connected with the peripheral portion of the flange engageable with the body portion of the hub at the side opposite the flange for clutching together the hub and the flange in the event that there is slippage of said friction means.

7. In clutch mechanism, the combination of a shaft fixedly carrying a hub, a flange in front of said hub and of greater diameter and having an axial rearward peripheral extension in substantially embracing relation to the hub, friction clutch means for clutching the flange to the hub, and means comprising an axially movable locking ring disposed at the rear of the hub and connected at its periphery with the axial extension of the flange for engaging the hub in order to clutch it to the flange in the event that there is slippage of said friction means.

8. In clutch mechanism, the combination of a shaft fixedly carrying a hub, a recessed flange in front of the hub and of greater diameter, cone clutch means for clutching together the peripheral portion of the hub and the recessed portion of the flange, and means comprising an axially movable locking ring connected with the peripheral portion of the flange engageable with the hub for clutching together the hub and the flange in the event that there is slippage of said cone clutch means.

9. In clutch mechanism, the combination of a shaft fixedly carrying a hub, said hub having a sleeve portion embracing said shaft and a body portion extending outwardly from said sleeve portion, a flange in front of said hub and of greater diameter having an axial rearward extension in substantially embracing relation to said hub and also having a recessed portion, friction clutch means comprising cone surfaces for interclutching the rim portion of said hub and the recessed portion of the flange, and an axially movable ring member connected at its periphery with said axial extension of the flange and engageable positively with the body portion of the hub at the rear of the latter.

10. In clutch mechanism, the combination of a shaft fixedly carrying a hub, a flange in front of the hub, said flange and said hub being fixed against axial movement, friction clutch means for clutching the peripheral portion of said flange to the peripheral portion of said hub, an axially movable locking ring at the rear of the hub adapted to have positive clutching engagement therewith, means for frictionally connecting said ring to the peripheral portion of said flange, and means for shifting said ring into engagement with the hub.

11. In clutch mechanism, the combination of a rotary member in the form of a flange having a peripheral axial extension providing a cup-shaped structure, a shaft extending into the cup-shaped structure, a hub fixed on the shaft adjacent the flange and having a shaft-embracing sleeve and an outwardly extending web and a rim, a web fixed angularly to said peripheral extension at the rear portion of the latter and extending radially inwardly toward the shaft and provided with a sleeve mounting it for rotation about the shaft, a plurality of levers in the form of elbows pivoted at their elbow portions relatively to said last named web and having actuating portions extending toward said shaft and other portions extending in a generally forward direction, an actuating sleeve having slot like portions in which the inner ends of said actuating lever portions are received, means for shifting said last named sleeve in a forward and rearward direction, and means operable by the forwardly extending portions of said elbow levers for frictionally connecting the rim of said hub to said flange member by pairs of friction surfaces brought into action successively including a ring like member having its body located in front of the forwardly extending portions of said levers and adapted to be thrust forwardly by said portions for engaging the clutch.

12. In clutch mechanism, the combination of a shaft, a hub member having a sleeve embracing and fixed longitudinally to one end of the shaft and provided with an outwardly extending web and with a rim at the periphery, a member in the form of a flange located adjacent one end of said hub and rotatable concentrically to said shaft and having an axial extension whereby said member is in enclosing relation to said hub and its associated structure, friction clutch means for connecting the rim of said hub to said flange in different regions including sequentially acting pairs of surfaces of which those of at least one pair are cone surfaces, a web extending from the rear or unattached end of the flange member toward the shaft and rotatable by the flange member, levers for operating said friction clutch means in the form of elbows pivoted at their elbow portions relatively to said web and having forwardly directed portions movable to engage the friction clutch means and actuating portions extending toward the shaft and having free ends, and an actuating sleeve extending around the shaft and movable axially and socketed to receive said free ends and to shift them in a generally forward and rearward direction.

13. In clutch mechanism, the combination of a shaft, a hub member having a sleeve embracing and locked to one end of the shaft and provided with an outwardly extending web and with a rim at the periphery, a member in the form of a flange located adjacent one end of said hub and rotatable concentrically to said shaft and having an axial extension whereby said member is in enclosing relation to said hub and its associated structure, friction clutch means for connecting the rim of said hub to said flange in different regions including friction clutch elements movable successively in an axial direction to engage the clutch, a web extending from the rear or unattached end of the flange member toward the shaft and rotatable by the flange member, levers for operating said friction clutch means in the form of elbows pivoted at their elbow portions relatively to said web and having forwardly directed portions movable to engage the friction clutch means and actuating portions extending toward the shaft and having free ends, and an actuating sleeve extending around the shaft and movable axially and socketed to receive said free ends and to shift them in a generally forward and rearward direction, said friction clutch means including an axially slidable friction member movable with respect to the hub web and adapted to engage a friction surface on the body of the flange, a second friction member adapted to engage the first and to move it into operative position, and a third member which is shifted by said levers and which is spring-connected to said second friction member and adapted to move it to operative position.

14. In clutch mechanism, the combination of a rotary member in the form of a flange having a peripheral axial extension providing a cup-shaped structure, a shaft extending into the cup-shaped structure, a hub fixed longitudinally on the shaft adjacent the flange and having a shaft-embracing sleeve and an outwardly extending web and a rim, a web fixed to said peripheral extension at the rear portion of the latter and extending inwardly toward the shaft, a plurality of levers in the form of elbows pivoted at their elbow portions relatively to said web and having actuating portions extending toward said shaft and other portions extending in a generally forward direction, an actuating sleeve connected to the inner ends of said levers, means for shifting said last-named sleeve in a forward and rearward direction, and means operable by the forwardly extending portions of said elbow levers for frictionally connecting the rim of said hub to said flange including a ring-like member having its body located in front of the forwardly extending portions of said levers and adapted to be thrust forwardly by said portions for engaging the clutch and also including an internal cone surface within the flange adjacent the connection of the extension with the flange body.

15. In clutch mechanism, the combination of a rotary member in the form of a flange having a peripheral axial extension providing a cup-shaped structure, a shaft extending into the cup-shaped structure, a hub fixed longitudinally on the shaft adjacent the flange and having a shaft-embracing sleeve and an outwardly extending web and a rim, a web fixed to said peripheral extension at the rear portion of the latter and extending inwardly toward the shaft, a plurality of levers in the form of elbows pivoted at their elbow portions relatively to said web and having actuating portions extending toward said shaft and other portions extending in a generally forward direction, an actuating sleeve connected to the inner ends of said levers, means for shifting said last-named sleeve in a forward and rearward direction, and means operable by the forwardly extending portions of said elbow levers for frictionally connecting the rim of said hub to said flange including pairs of sequentially acting surfaces, one of said pairs comprising an internal cone surface associated with the flange and an external cone surface associated with the hub.

16. In clutch mechanism, the combination of a rotary member in the form of a flange having a peripheral axial extension providing a cup-shaped structure, a shaft extending into the cup-shaped structure, a hub fixed on the shaft adjacent the flange and having a shaft-embracing sleeve and an outwardly extending web and a rim, means for frictionally connecting the rim of the hub to the flange in different regions including a member slidably keyed to the rim of the hub and adapted to engage the body of the flange, a second member keyed to said extension and adapted to push the first member into engagement with the flange, a third member keyed to the extension adapted to shift the second into operative position, an inwardly extending web carreid by the extension at its rear portion, levers pivoted on said web adapted to shift said third member, and means for actuating said levers.

17. In clutch mechanism, the combination of a rotary member in the form of a flange having a peripheral axial extension providing a cup-shaped structure, a shaft extending into the cup-shaped structure, a hub fixed on the shaft adjacent the flange and having a shaft-embracing sleeve and an outwardly extending web and a rim, friction means for connecting the flange in different regions to the hub rim comprising a slidably keyed friction member on the hub rim adapted to engage the flange and a ring like friction member keyed to said extension and adapted to move the first friction member into engagement with the flange, a web connected to the rear portion of said extension and extending toward said shaft, a flange-like member on said web located inwardly of said last-named friction member for guiding the same forwardly and rearwardly, levers pivotally mounted on said last-named web for shifting said last-named friction member, and means for actuating said levers.

18. In clutch mechanism, the combination of a rotary member in the form of a flange having a peripheral axial extension providing a cup-shaped structure, a shaft extending into the cup-shaped structure, a hub fixed on the shaft adjacent the flange and having a shaft-embracing sleeve and an outwardly extending web and a rim, a web fixed to said peripheral extension at the rear portion of the latter and extending inwardly toward the shaft and provided between the extension and the shaft with a forwardly and rearwardly extending flange, friction means for connecting different portions of the rotary flange member aforesaid with the hub rim disposed in part radially outwardly of the flange on said web and in part forwardly of said flange, and means including levers pivoted on said second-mentioned web for actuating said friction means.

19. In clutch mechanism, the combination of a hub having a shaft-embracing sleeve and a web and a rim, a cup-shaped member independently rotatable and enclosing said hub, a web on the cup-shaped member closing in the hub at the rear, said web having a forwardly projecting flange, means disposed radially inwardly of said flange and in movable interlocked relation to the flange for interlocking the cup-shaped member positively with said hub, and friction means disposed in part radially outwardly of said flange and in part forwardly thereof for frictionally connecting the cup-shaped member to the hub by a sequential action of different pairs of friction surfaces.

20. In clutch mechanism, the combination of a rotary member in the form of a flange having a peripheral axial extension providing a cup-shaped structure, a shaft extending into the cup-shaped structure, a hub fixed on the shaft adjacent the flange and having a shaft-embracing sleeve and an outwardly extending web and a rim, a web fixed to said peripheral extension at the rear portion of the latter and extending inwardly toward said shaft provided intermediate said extension and said shaft with a forwardly extending flange, friction means for connecting different parts of the rotary flange member aforesaid to the hub rim disposed in part radially outwardly of the flange on said web and in part forwardly of said flange, means for operating said friction means, and means located radially inwardly of said last-named flange in movable interlocked relation to said flange and operable by said operating means for locking said rotary member positively to said hub.

21. In clutch mechanism, the combination of a rotary member in the form of a flange having a peripheral axial extension, a hub adjacent the flange having a shaft-embracing sleeve and an outwardly extending web and a rim, a web fixed to said peripheral extension at the rear portion of the latter and extending inwardly therefrom, friction means for connecting different portions of said flange to the hub rim including a member keyed to the hub rim and adapted to engage the flange and a second member keyed to the extension and adapted to engage the first member and shift it into engagement with the flange, actuating means for said friction means including levers having pivotal relation to the second web and an axially movable sleeve for actuating said levers, and means adapted to be shifted by said last-named sleeve for positively interlocking the hub with the rotary flange-like member.

22. In clutch mechanism, the combination of a rotary member in the form of a flange having a peripheral axial extension, a hub adjacent the flange having a shaft-embracing sleeve and an outwardly extending web and a rim, a web fixed to said peripheral extension at the rear portion of the latter and extending inwardly therefrom, friction means for connecting different portions of said flange to the hub rim including a member keyed to the hub rim and adapted to engage the flange and a second member keyed to the extension and adapted to engage the first member and shift it into engagement with the flange, actuating means for said friction means including levers having pivotal relation to the second web and an axially movable sleeve for actuating said levers, and means adapted to be shifted by said last-named sleeve for positively interlocking the hub with the rotary flange-like member comprising a ring-like locking member having a resilient connection with said sleeve whereby it is pushed into locking engagement with said hub at the rear of the latter.

23. The combination of a driving member in the form of a cup having a body or bottom and an axial side wall, a web connected to said side wall at an end remote from the body, a driven shaft extending into the cup and about which said web is rotatable, a hub longitudinally fixed to the driven shaft within the cup, actuating levers mounted from the web around the driven shaft, and friction clutch means within the cup actuated by said levers for connecting the driven shaft to the driving member including sequentially acting pairs of friction surfaces, one of said pairs being located in the angle between the cup bottom and the side wall adjacent the bottom and another pair being more remote from the cup bottom and nearer the web.

24. A structure such as set forth in claim 23 in which two of the friction surfaces are external peripheral cone surfaces provided on the hub, and in which the co-acting surfaces are radially inner surfaces provided on axially and oppositely moving ring members.

25. In clutch mechanism, the combination of a hub having a shaft-embracing sleeve, a cup-shaped member independently rotatable and enclosing said hub, a web connected to the cup-shaped member closing in the hub at the rear, said web having a forwardly and inwardly projecting flange, means disposed radially inwardly of said flange and in movable interlocked relation to the flange for interlocking the cup-shaped member positively with said hub, and friction means disposed in part radially outwardly of said flange and in part forwardly thereof for frictionally connecting the cup-shaped member to the hub.

26. In clutch mechanism, the combination of a longitudinally fixed hub having a shaft-embracing sleeve, a cup-shaped member independently rotatable and enclosing said hub, a web connected to the cup-shaped member closing in the hub at the rear, friction clutch means between the hub and the cup-shaped member located in the radially outer part of the cup-shaped member, positive clutch means including a locking ring disposed radially inwardly of the cup-shaped member and having a radially outer keying part in interlocked relation to said cup-shaped member and movable axially to engage said hub for locking said member to said hub, means including an axially movable sleeve for shifting said locking ring into engagement with the hub, and levers in pivotal relation to said web for actuating said friction means from said sleeve.

27. A structure such as set forth in claim 26, in which resilient connecting means are provided between the sleeve and the locking ring.

ARTHUR T. NABSTEDT.